United States Patent [19]

Chiba et al.

[11] 4,434,977

[45] Mar. 6, 1984

[54] STRUT TYPE SUSPENSION FOR A VEHICLE

[75] Inventors: Kazuo Chiba, Tokyo; Iwao Nakamura, Yokohama, both of Japan

[73] Assignee: Nissan Motor Company, Limited, Yokohama, Japan

[21] Appl. No.: 367,712

[22] Filed: Apr. 12, 1982

Related U.S. Application Data

[63] Continuation of Ser. No. 140,944, Apr. 16, 1980, abandoned.

[30] Foreign Application Priority Data

Apr. 18, 1979 [JP] Japan .................................. 54-48142

[51] Int. Cl.³ .............................. F16F 3/08; F16F 9/54
[52] U.S. Cl. .................................. 267/33; 188/321.11; 267/8 R; 267/152; 267/153; 280/668
[58] Field of Search ...................... 267/8 R, 33, 34, 35, 267/152, 153, 140.1; 188/321.11; 280/668

[56] References Cited

U.S. PATENT DOCUMENTS

| | | | |
|---|---|---|---|
| 3,037,787 | 6/1962 | Gottschald . | |
| 3,165,306 | 1/1965 | Tea . | |
| 3,417,986 | 12/1968 | Fuke | 267/33 |
| 3,434,708 | 3/1969 | Hawk, Jr. | 267/153 X |
| 3,584,856 | 6/1971 | Desbois | 267/34 |
| 3,953,010 | 4/1976 | deVos | 267/8 R X |
| 4,111,456 | 9/1978 | Arnold et al. | 267/8 R X |
| 4,175,770 | 11/1979 | Draisbach et al. . | |
| 4,256,292 | 3/1981 | Sullivan, Jr. et al. | 267/8 R |
| 4,260,177 | 4/1981 | Pflughaupt et al. | 267/33 X |
| 4,274,655 | 6/1981 | Lederman | 267/8 R X |
| 4,298,193 | 11/1981 | Mourray | 280/668 X |

FOREIGN PATENT DOCUMENTS

| | | |
|---|---|---|
| 2249174 | 4/1974 | Fed. Rep. of Germany . |
| 2447821 | 4/1976 | Fed. Rep. of Germany . |
| 2658835 | 6/1978 | Fed. Rep. of Germany ......... 188/321.11 |
| 7818309 | 6/1978 | Fed. Rep. of Germany . |
| 7823305 | 8/1978 | Fed. Rep. of Germany . |
| 1394137 | 2/1965 | France ............................. 188/321.11 |
| 1533055 | 6/1968 | France . |
| 1558529 | 1/1969 | France . |
| 2032961 | 11/1970 | France . |
| 2145082 | 2/1973 | France . |
| 2259711 | 8/1975 | France . |
| 2277690 | 2/1976 | France . |
| 2287355 | 5/1976 | France . |
| 2294869 | 7/1976 | France ............................. 188/321.11 |
| 2319813 | 2/1977 | France . |
| 2401787 | 3/1979 | France . |
| 51-60022 | 5/1976 | Japan . |
| 827261 | 2/1960 | United Kingdom . |
| 1238642 | 7/1971 | United Kingdom . |
| 1245658 | 9/1971 | United Kingdom . |
| 1495643 | 12/1977 | United Kingdom . |
| 2026131 | 1/1980 | United Kingdom . |
| 2027161 | 2/1980 | United Kingdom . |

*Primary Examiner*—George E. A. Halvosa
*Attorney, Agent, or Firm*—Schwartz, Jeffery, Schwaab, Mack, Blumenthal & Koch

[57] ABSTRACT

A strut type suspension for a vehicle includes a mounting insulator rubber divided into two separate parts, one attached to the piston rod of a shock absorber, and a relatively more rigid one associated with both a spring coil telescoped about the shock absorber and a bumper.

8 Claims, 3 Drawing Figures

STRUT TYPE SUSPENSION FOR A VEHICLE

This application is a continuation application of Ser. No. 140,944, filed Apr. 16, 1980, and now abandoned.

BACKGROUND OF THE INVENTION

The present invention relates to a strut type suspension for a vehicle.

In order to provide a strut type suspension for a vehicle body, a single insulator made of rubber is commonly applied to both a piston rod of a shock absorber and a coil spring which is attached to the shock absorber of the vehicle body. Such an insulator must have a high rigidity for the purposes of increasing its durability and decreasing the maximum magnitude of its deflection, because a great magnitude of force from the vehicle body and a bumper pad fitted to the shock absorber is applied thereto. Thus, the insulator can not effectively damp the small oscillations which occur when the piston rod of the shock absorber is in fixed relationship with a strut tube of the strut so that the driver feels uncomfortable due to small oscillations of the vehicle body.

Another conventional insulator is divided into two parts, one for the shock absorber and bumper pad, and the other for the coil spring. Such an insulator must also have a high frigidity so as to increase its durability and decrease its maximum deflection. This arrangement likewise results in the driver's uncomfortable feeling.

SUMMARY OF THE INVENTION

An object of the present invention is to eliminate such disadvantages of the prior art strut type suspensions.

A further object of the present invention is to improve the driver's and/or passenger's comfort during driving.

It is still a further object of the present invention to provide an improved strut type suspension wherein small oscillations can be effectively damped when a shock absorber is in a fixed condition.

According to the present invention, a suspension for a vehicle includes a mounting insulator rubber divided into two separate parts, one for a piston rod of a shock absorber, and the other for both a spring coil associated with the shock absorber and a bumper rubber fitted on the piston rod of the shock absorber. It is preferable that the spring coil rubber have a greater rigidity than that of the piston rod rubber.

BRIEF DESCRIPTION OF THE DRAWINGS

These and other objects and features of the present invention will become more apparent from the following description of a preferred embodiment thereof taken in conjunction with the accompanying drawings in which.

DESCRIPTION OF THE PREFERRED EMBODIMENT

Figure 1:
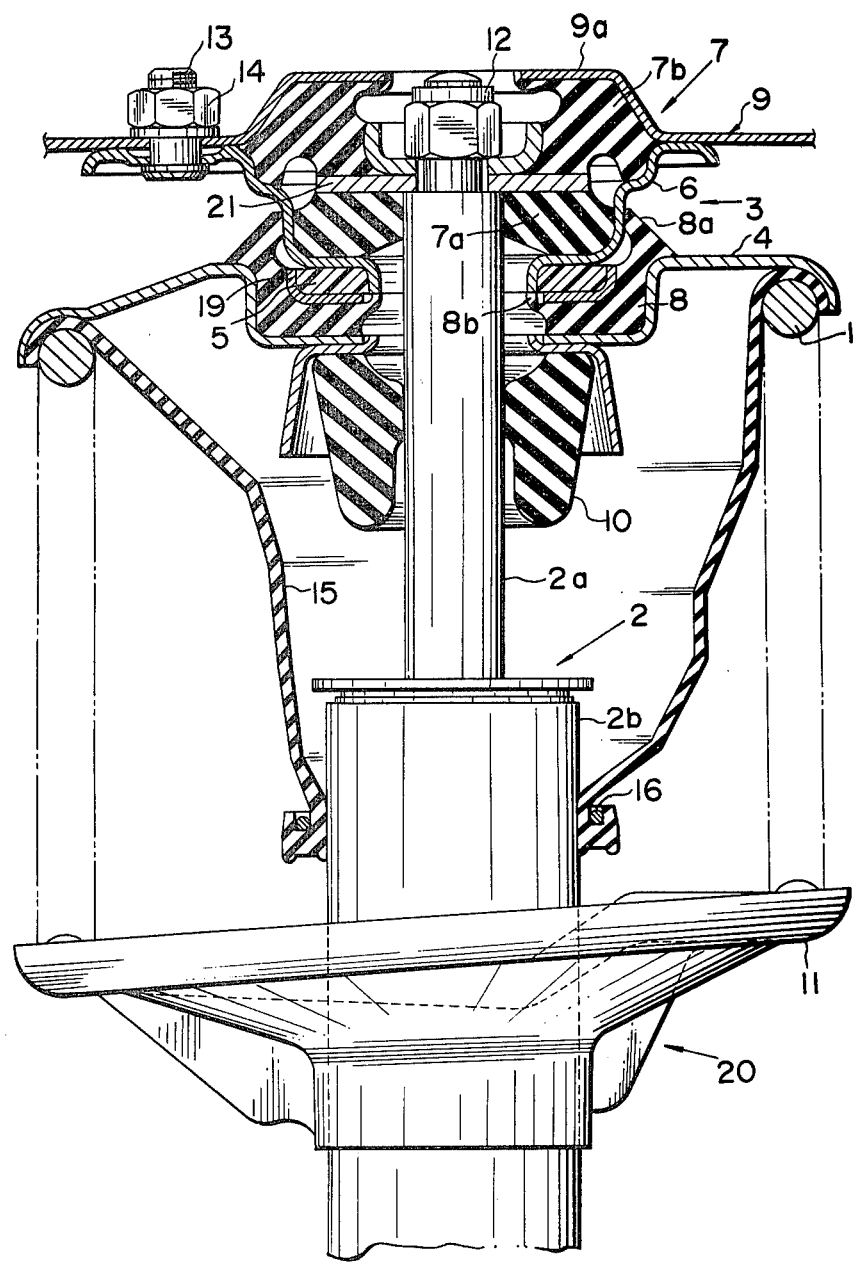
FIG. 1 is a vertical section showing a strut type front suspension according to the present invention.

Referring now to FIG. 1, a strut type suspension 20 is connected at its lower end to a steering knuckle (not shown) and is provided with a shock absorber 2 in a well known manner. The strut 20 is connected through a piston rod 2a protruding from its top end and a mounting insulator 3 to the vehicle body 9. A coil spring 1 is attached between a lower spring seat 11 on the shock absorber outer casing 2b and an upper spring seat 4 on the mounting insulator 3. The mounting insulator 3 includes a first insulator rubber 7 for the piston rod 2a and a second insulator rubber 8 for the coil spring 1, the first and second insulators 7, 8 being separate from each other. The first insulator rubber 7 is fitted between a portion 9a of the vehicle body 9 and a circular bracket 6 fixed to the vehicle body 9 by a bolt 13 and nut 14 in such a way that the lower and upper portions 7a, 7b of the first insulator 7 press in the opposite directions against a washer 21 fixed at the top end of the piston rod 2a by a self-locking nut 12. The second insulator rubber 8 is placed between the upper spring seat 4 and a second bracket 19 attached through a bearing 5 onto the lower portion of the first bracket 6 in such a way that it does not contact the piston rod 2a. The second insulator rubber 8 has a greater rigidity than that of the first insulator rubber 7. For example, the spring constant of the second insulator rubber 8 could be set at 100 kg/mm, being greater than the normal rigidity of the prior art mounting insulator while the spring constant of the first insulator rubber 7 could be set at 20 kg/mm. Such spring constants of the first and second insulator rubbers 7, 8 may be selected depending on their configurations and other factors.

The bearing 5 allows the shock absorber 2 to rotate around the axis of the piston 2a. Both ends 8a, 8b of the second insulator rubber 8 abut resiliently against the first bracket 6 so as to seal the bearing 5 therebetween. A bumper rubber or pad 10 fitted onto the piston rod 2a functions to dampen and limit the action of the shock absorber 2 of the strut 20 when it bounds. A dust cover or seal 15 is attached at its upper end between the lower face of the upper spring seat 4 and the upper portion of the coil spring 1 and at its lower end to the shock absorber outer casing 2b by a snap ring 16.

In operation, the inputs from the coil spring 1 and the bumper rubber 10 in case of the shock absorber's bounding are transmitted through the upper spring seat 4, second insulator rubber 8 and bracket 6 to the vehicle body 9. The inputs from the piston rod 2a of the shock absorber 2 are transmitted through the first insulator rubber 7 and/or the bracket 6 to the vehicle body 9. As the separate insulator rubbers 7 and 8 are used, even if the shock absorber 2 is in a fixed condition so that the piston rod 2a and the outer casing 2b move as a single element, the small oscillation of the strut 20 can be effectively damped.

Figure 2:
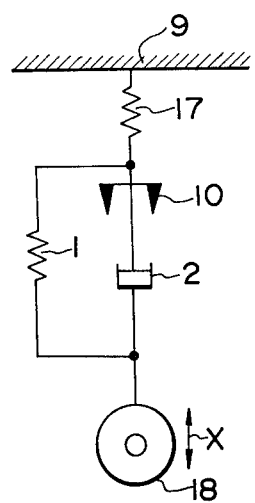
FIG. 2 is a schematic view showing in a simplified form a conventional strut type suspension model.
Figure 3:
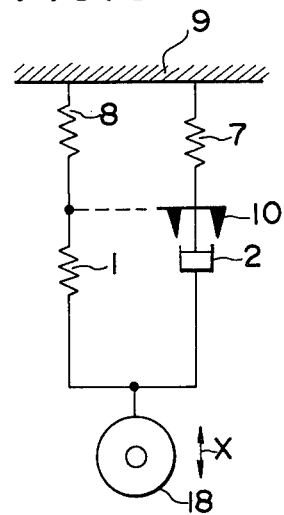
FIG. 3 is a view similar to FIG. 2, showing a strut type suspension model according to the present invention.

FIG. 2 shows a prior art model device, and FIG. 3 shows a model device according to the present invention. The same references as those in FIG. 1 denote the corresponding or like members. 18 denotes a tire. In FIG. 2, the spring constant $K_{11}$ of the insulator rubber 17 is 60 kg/mm, and the spring constant $K_s$ of the coil spring 1 is 2 kg/mm. In FIG. 3, the spring constant $K_{13}$ of the first insulator rubber 7 is 20 kg/mm, the spring constant $K_{12}$ of the second insulator rubber 8 is 100 kg/mm, and the spring constant $K_s$ of the coil spring 1 is 2 kg/mm. The displacement x of the tire 18 is assumed as a small oscillation of 2 mm. The spring constants of the total spring systems in FIGS. 2 and 3 are given as follows, respectively:

(1) In case of the prior art, the piston rod of the shock absorber 2 and the strut tube of the strut are rigidly connected to each other so that the displacement x of the tire 18 is directly transmitted to the insulator rubber 17, thereby the spring constant $K_{11}$ of the insulator rubber 17 being applied to the total spring system. Consequently, the total spring constant K is given as follows:

$$K = K_{11} = 60 \text{ kg/mm}$$

(2) According to the present invention, the spring constant K of the total spring system is given as follows:

$$K = \frac{1}{1/K_{12} + 1/K_s} + K_{13} = 22 \text{ kg/mm}$$

As can be seen from the foregoing, according to the present invention, an insulator rubber is divided into two separate parts, one for a piston rod of a shock absorber and the other for a coil spring and a bumper rubber so that the spring constant of the total spring system can be decreased about ⅓ as compared with that of the prior art spring system when the shock absorber is in a fixed condition. Thus, the driver's and passenger's comfort can be remarkably improved.

The present invention may be practiced in other ways without departing from the spirit or essential character thereof. For instance, the second insulator rubber may be further divided into two separate parts, one for a coil spring and the other for a bumper rubber.

What is claimed is:

1. A strut type suspension for a vehicle body, comprising:
    a shock absorber having an outer casing;
    said shock absorber having a piston rod extending from said outer casing;
    a lower spring seat fixed to said outer casing;
    an upper spring seat loosely and movably fitted about the periphery of said piston rod above and facing said lower spring seat;
    a coil spring positioned between said upper and lower spring seats and encircling said piston rod;
    a bumper rubber fitted on said piston rod between the upper end of said outer casing and the lower side of said upper spring seat;
    an upwardly opening cup-shaped first bracket fixed adjacent its outer peripheral portion thereof to the vehicle body, said first bracket positioned between said upper spring seat and said vehicle body, said cup-shaped first bracket having an aperture in its bottom through which said piston rod extends;
    a first insulator rubber positioned at least partially within and generally between said cup-shaped first bracket and said vehicle body, an upper end portion of said piston rod including means for attaching said piston rod to said first insulator rubber such that said piston rod is resiliently supported relative to the vehicle body by said first insulator rubber; and
    a second insulator rubber generally spaced from and coaxial with said piston rod and positioned between and in contact with the lower side of said first bracket and the upper side of said upper spring seat, said second insulator rubber having a greater rigidity than that of said first insulator rubber.

2. A strut type suspension in accordance with claim 1 wherein the inner and outer peripheries of said second insulator rubber abut resiliently and sealably on said first bracket and a bearing is disposed between said first bracket and said second insulator rubber, said bearing allowing said strut to rotate around an axis of said piston rod.

3. A strut type suspension in accordance with claim 1, wherein said means for attachment includes a washer fixed axially on said piston rod, said first insulator rubber having separate upper and lower portions for pressing against said washer from opposite directions.

4. A strut type suspension for a vehicle body, comprising:
    a shock absorber having an outer casing and having a piston rod extending from said outer casing;
    a lower spring seat fixed to said outer casing;
    an upper spring seat provided above said lower spring seat;
    a coil spring placed between said upper and lower spring seats;
    a bumper rubber fitted on said piston rod of said shock absorber and disposed below said upper spring seat;
    a mounting insulator including first and second insulator rubbers, said first insulator rubber being associated with said piston rod and receiving and absorbing a force from said piston rod, and said second insulator rubber being associated with said upper spring seat and with said bumper rubber and receiving and absorbing a force from said coil spring and said bumper rubber, said second insulator rubber having a greater rigidity than that of said first insulator rubber; and
    a first bracket, fixed to said vehicle body, and generally positioned between said first and second insulator rubbers to transmit vibrations from said first and second insulators to said vehicle body;
    wherein the inner and outer peripheries of said second insulator rubber abut resiliently and sealably on the first bracket and a bearing is disposed between said first bracket and said second insulator rubber and positioned between said inner and outer peripheries, said bearing allowing said strut to rotate around an axis of said piston rod.

5. A strut type suspension in accordance with claim 4, wherein said second insulator rubber is placed between said upper spring seat and said first bracket.

6. A strut type suspension in accordance with claim 4, wherein a second bracket is placed between said second insulator rubber and said bearing.

7. A strut type suspension in accordance with claim 4, wherein said first insulator rubber is attached to a top of said piston rod.

8. A strut type suspension for a vehicle body comprising:
    a shock absorber having an outer casing and a piston rod extending from an upper end of the outer casing;
    a lower spring seat fixed to the outer casing;
    a centrally apertured upper spring seat loosely and movably fitted around the piston rod above the lower spring seat;
    a coil spring encircling the piston rod and positioned between the upper and lower spring seats;
    a bumper rubber fitted on the piston rod and axially positioned between the upper end of the outer casing and the lower side of the upper spring seat to axially receive and absorb forces transmitted by the upper end of the outer casing;

an upwardly opening centrally apertured cup-shaped first bracket loosely and movably fitted around the piston rod and fixed adjacent its outer peripheral portion thereof to the vehicle body, said first bracket axially positioned above said upper spring seat and positioned below said vehicle body;

a centrally apertured first insulator rubber positioned within said cup-shaped first bracket, the upper end portion of the piston rod including means for attaching said end portion within said first insulator rubber such that the piston rod is resiliently supported relative to the vehicle body by said first insulator rubber, whereby said first insulator rubber axially receives and absorbs forces transmitted by the piston rod, and a centrally apertured second insulator rubber positioned between the upper side of said upper spring seat and the lower side of said first bracket whereby the outer casing is resiliently supported relative to the vehicle body by said second insulator rubber, and whereby said second insulator rubber axially receives and absorbs forces transmitted by the coil spring and said bumper rubber, said second insulator rubber having greater rigidity than said first insulator rubber.

* * * * *